E. A. TUTTLE.
Hot Air Registers.

No. 136,682.

Patented March 11, 1873.

Witnesses:
E. Wolff.
C. Sedgwick.

Inventor:
E. A. Tuttle
per Munn & Co.
Attorneys.

UNITED STATES PATENT OFFICE.

EDWARD A. TUTTLE, OF BROOKLYN, NEW YORK.

IMPROVEMENT IN HOT-AIR REGISTERS.

Specification forming part of Letters Patent No. 136,682, dated March 11, 1873.

*To all whom it may concern:*

Be it known that I, EDWARD A. TUTTLE, of Brooklyn, in the county of Kings and State of New York, have invented a new and Improved Register for Hot Air, of which the following is a specification:

My invention consists of an extension of the hot-air pipes of furnaces and the like a considerable distance above the floor, through large holes adapted to allow the air to circulate around the pipes as a protection against fire, the valves being placed on the top of the pipes so that the falling of the sweepings and other matters into the pipes is effectually prevented, the whole being inclosed in an ornamental guard or screen of open metal-work, which protects the pipes and hides them and the opening through the floor from view.

Figure 1:
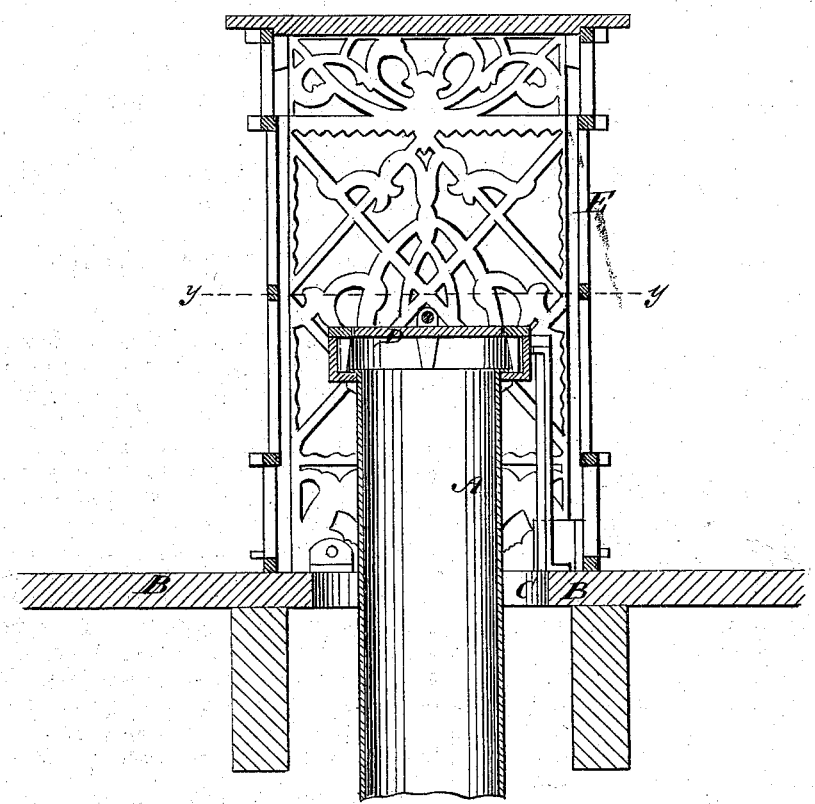
Figure 2:
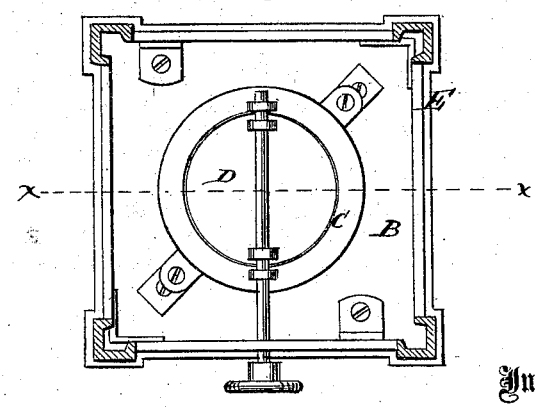

Figure 1 is a sectional elevation of my improved register taken on the line *x x* of Fig. 2, and Fig. 2 is a horizontal section taken on the line *y y* of Fig. 1.

Similar letters of reference indicate corresponding parts.

A is the hot-air pipe, which is extended considerably above the floor B, as shown, a large hole, C, being made for it through the floor to allow a sufficient circulation of air to prevent the ignition of the wood and save the expensive filling in of soap-stone, marble, or other non-conducting substances commonly used around the pipes when stopping at the floor, not only as a protection against fire, but to prevent the falling of small objects through that may happen to lie on and be moved about the floor. D represents the valve in the top of the pipe, and E represents the screen and guard.

By having the pipes thus extended and guarded the necessity for a filling around the pipes as a preventive to the fall of objects through is avoided, and a considerable expense is thereby saved, for such filling must of necessity be of non-conducting material, which is expensive, and by having the pipes thus extended the collection of refuse matters in them is avoided. The floor is protected from the hot air when discharged from the pipes; it is also better protected from the hot air when the register is closed, for in this case the hottest part of the confined air is above the floor.

Having thus described my invention, I claim as new and desire to secure by Letters Patent—

1. A top-valved hot-air extension pipe, A, passing through and a considerable distance above the floor, as and for the purpose described.

2. The screen-guard E, arranged with respect to a hot-air pipe, A, as and for the purpose set forth.

EDWARD A. TUTTLE.

Witnesses:
   T. B. MOSHER,
   C. SEDGWICK.